United States Patent [19]

Blum et al.

[11] Patent Number: 4,919,850

[45] Date of Patent: Apr. 24, 1990

[54] METHOD FOR CURING PLASTIC LENSES

[76] Inventors: Ronald D. Blum, 5320 Silver Fox Rd., Roanoke, Va. 24014; Scott Reid, 24 Tanglewood Dr., Irvine, Calif. 92714; Howard P. Silverman, 140 E. Duarte Rd., Monrovia, Calif. 91016

[21] Appl. No.: 190,856

[22] Filed: May 6, 1988

[51] Int. Cl.$^5$ .............................. B29D 11/00
[52] U.S. Cl. .................... 264/1.4; 264/1.7; 264/2.1; 264/2.2; 264/2.6; 264/2.7; 264/22; 264/26; 425/174.4; 425/174.8 E; 425/808
[58] Field of Search ............ 264/1.4, 2.2, 2.6, 2.7, 264/22, 26, 1.7, 2.1; 465/808, 174.8 E, 174.4

[56] References Cited

U.S. PATENT DOCUMENTS

| | | |
|---|---|---|
| 3,171,869 | 3/1965 | Weinberg ............ 264/1.4 |
| 3,983,083 | 9/1976 | Kaetsu et al. ......... 264/1.4 |
| 4,166,088 | 8/1979 | Neefe ................ 264/1.4 |
| 4,390,482 | 6/1983 | Feurer ............... 264/1.4 |
| 4,497,754 | 2/1985 | Padoan ............... 264/1.4 |
| 4,728,469 | 3/1988 | Danner ............... 264/1.4 |
| 4,774,035 | 9/1988 | Carmelite et al. ...... 264/1.4 |

FOREIGN PATENT DOCUMENTS

| | | | |
|---|---|---|---|
| 226123 | 6/1987 | European Pat. Off. ...... 264/1.4 |
| 167125 | 10/1983 | Japan ................... 264/1.4 |
| 39526 | 3/1984 | Japan ................... 264/1.4 |

Primary Examiner—James Lowe
Attorney, Agent, or Firm—Kenyon & Kenyon

[57] ABSTRACT

The disclosure relates to a method and apparatus for making lenses and a composition of molding material which can be utilized in the method and apparatus for molding lenses of optical quality. A monomer is used with initiators in conjunction with the molding apparatus to mold plastic lenses of optical quality without requirement for any additional polishing or grinding, except for perhaps shaping the edges. The molding material includes a composition of liquid monomer with a thermal initiator and a UV initiator each of which can be activated during the molding process. Initially, the molding forms with the liquid monomer compositions therein are heated to activate the thermal initiator and form the molding material into a gel. The gelled material is then subjected to a UV light source for completing the cure. Prepolymerized molding material can be used in some instances to avoid an intermediate step of thermal curing. Various other embodiments and apparatus are disclosed for molding plastic lens.

24 Claims, 3 Drawing Sheets

METHOD FOR CURING PLASTIC LENSES

BACKGROUND OF THE INVENTION

In manufacturing lenses, and particularly lenses for use with eyeglasses, the use of plastics is often desirable due to their weight and durability. Normally in manufacturing plastic lenses, two molds in conjunction with a gasket are placed in a spaced relationship to provide a mold cavity therebetween. This mold cavity ultimately forms the shape, curvature, thickness, and configuration of the product lens. Plastic material is injected into the mold cavity and cured to harden the lens with the exterior surfaces being configured to a particular patient's prescription. In the past, to achieve the final desired surface configuration and optical quality, additional grinding and polishing of each lens may have been required. In large ophthalmic facilities, it is economically feasible to employ lens grinding apparatus and technicians to grind the lenses at the site for each patient. For smaller offices, however, the capital costs and operating expenses involved in the grinding process are typically prohibitive.

This invention relates to a method for molding and curing prescription quality plastic lenses in a short period of time to produce a lens satisfactory to the patient while being economically feasible for the small office and also create economies for the entire optical industry.

One approach in molding plastic lenses is the use of a liquid monomer and a thermal initiator or catalyst in conjunction with a heat source to effect thermal curing of the lens. See Hungerford, et al., U.S. Pat. No. 3,038,210, issued June 12, 1962, and Grandperret, U.S. Pat. No. 3,222,432, issued Dec. 7, 1965. Hungerford, et al., Grandperret, have shown thermal curing to be a time-consuming method of producing optical quality plastic lenses. The process of thermal curing, or heat-induced polymerization of the liquid monomer, takes at least fourteen (14) to nineteen (19) hours to complete, plus any additional grinding, polishing, and finishing time required to provide a lens of optical quality.

Another approach in molding plastic lenses is the use of a liquid monomer and a photosensitive initiator or catalyst in conjunction with an ultraviolet light source to effect polymerization or curing of the lens. See Neefe, U.S. Pat. No. 4,166,088, issued Aug. 28, 1979, and Mutzhas, U.S. Pat. No. 4,298,005, issued Nov. 3, 1981. Although curing with ultraviolet light may be accomplished faster than thermal curing, it can still require up to two (2) hours or more to complete and also produces lenses with unacceptable optical aberrations caused by uneven curing and stress. Ultraviolet light curing has also been found to produce lenses that are discolored and unclear and of insufficient hardness.

The invention described herein is a new method for curing plastic lenses that overcomes many of the problems inherent in both the processes of thermal and ultraviolet light curing and the lenses produced thereby. The invention relates to the use of a lens material mixture of liquid monomer, a thermal initiator, plus a photosensitive initiator in conjunction with a mold apparatus and utilization of both thermal curing and ultraviolet light curing processes, either simultaneously or separately. In this process, the liquid monomer lens material is injected into the desired ultraviolet-light-transparent mold apparatus and subjected while therein to heated fluid curing for a short period of time, less than ten (10) minutes. It is believed that this heated fluid curing acts in conjunction with the thermal initiator to form the lens material mixture into a gel which freezes the photosensitive initiator in place throughout the lens material. Furthermore, it is believed this gelled state preestablishes the optical framework needed for an optical lens free of optical distortion or imperfections. After the lens material mixture has sufficiently gelled, it is then subjected to ultraviolet light to activate the photosensitive initiator and complete the polymerization or curing process. The process of this invention has produced a lens of optical quality in less than thirty (30) minutes.

In another embodiment, the same end result can be accomplished by utilization of UV initiator only by first using a known intensity and wavelength of a UV light source to accomplish gelling of the resin and then using a different intensity and or wavelength or both to finish the curing process.

An additional problem encountered in thermal curing is what is referred to as a "thermal runaway," a problem created by the exothermic nature of the polymerization of the liquid monomer lens material used with a thermal initiator. An alternative embodiment of Applicant's invention employs curing the lens material in a microwave oven using a liquid cooling system to control mold temperature to avoid the problem of "thermal runaway." The mold is supported within a rotating container through which cooling liquid will pass. The cooling liquid is delivered from a tank adjacent to the microwave oven, pumped through the oven at a predetermined rate, and passed over the mold to withdraw the heat of the exothermic reaction caused by the microwave effect on the monomer and then out of the oven into a holding tank for recycling after first being cooled. In addition, the mold will be rotated to insure that the microwave effect and the fluid cooling effect occur evenly over all the surfaces of the mold. With this approach, "thermal runaway" is avoided.

Another approach is to prepare a monomer with either a thermal initiator, or a UV initiator, and/or both. After the molding material has been cured using heat, UV, or both, the lens may not be fully cured. To further harden the lens or otherwise complete the cure, the lens is withdrawn from the mold and subjected to UV rays or both.

A prepolymerization step can also be used to enhance the curing process. With this approach, the monomer is partially polymerized prior to delivery into the mold. This speeds the curing process and avoids the extensive cooling, particularly for thermally induced reactions. When utilized with the microwave technique discussed above, depending upon the percentage of thermal initiator used the cooling step may be deleted altogether. After the curing within the oven, the mold can be removed and finally cured by UV or heat, depending on the type of initiators used. When used with UV cure the thermally prepolymerized resin intervening heating can be eliminated. The prepolymerized resin can proceed directly to the UV exposure, and achieve the same satisfactory end point. However, the curing time should not be as fast as the process where initially a gel is obtained.

An additional advantage of prepolymerization is the reduction of shrinkage during the molding process. Substantial shrinkage can cause fractures and prereleases of the molding material. By reducing this shrinkage, even by 4%, reduces these problems and increases yield.

Another approach contemplated by Applicant's invention is the use of cobalt treatment. This process takes approximately five (5) hours to complete and produces lenses with a blue coloring.

The above is a brief discussion of certain features of Applicant's invention. Other features and advantages of the invention will be appreciated from the detailed discussion of the preferred embodiments below.

DETAILED DISCUSSION OF THE PREFERRED EMBODIMENT

Figure 1:
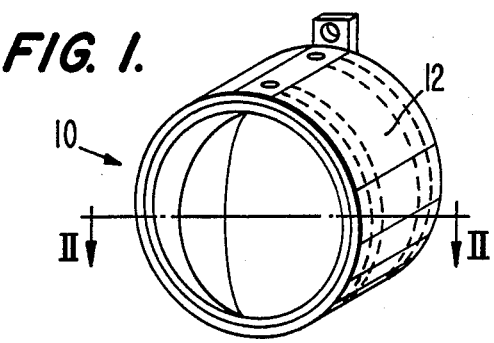
FIG. 1 is a perspective view of a mold apparatus for use in the invented process.
Figure 2:
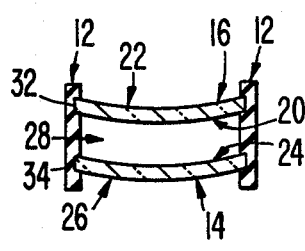
FIG. 2 is a cross-section of the mold apparatus shown in FIG. 1 taken along lines II—II.

The mold apparatus for use in curing and producing plastic lenses is shown in FIGS. 1 and 2. Mold 10 includes a flexible gasket 12 in the form of a band which completely circumscribes other elements of the mold. The mold includes a front form 14 and a rear form 16 releasably secured in a sealing relationship with respect to the gasket and spaced from one another to form cavity 28 therebetween. Each mold form 14 and 16 has a special configuration to produce at a lens having the desired power as required by the patient and prescribed by practicing opticians, optometrists, and ophthalmologists. Typically, there may be a large number of these mold forms which can be removed from the mold and replaced by forms which will have the desired configurations for a particular prescription.

As can be seen more clearly in FIG. 2, the first form 14 includes a convex surface 26 exterior exposed to the exterior of the mold and a concave surface 24 facing the interior of the mold cavity 28. The second mold form, or rear mold 16, includes an interior convex surface 20 and an exterior concave surface 22. For the purposes of defining the form of the lens, the interior surfaces 24 and 20 will impart to the lens the desired form to achieve the prescribed correction. The exterior surfaces 22 and 26 could optionally be of any configuration. The lens edges are designed to frictionally fit in annular grooves 32 and 34 to releasably secure them in place and seal them from the atmosphere. Once in place, a portion of the gasket can be peeled away to permit access for delivering monomer or liquid plastic material into the mold cavity 28 for forming the lens. As shown in FIG. 2, the front and rear mold forms are made of glass However, they could be made of another material so long as they are ultraviolet light transparent, have the desired configuration, and interact with the gasket as described above.

Figure 3:
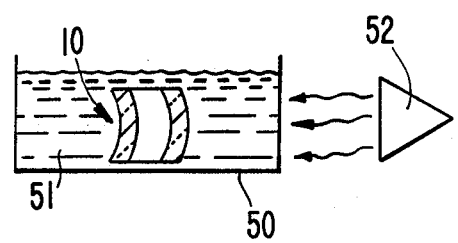
FIG. 3 is a representation of the liquid bath apparatus and the ultraviolet light source to used in the invented curing process.

The preferred method of Applicant's invention is performed as follows. An edge of gasket 12 is peeled back and liquid lens material is dispensed into cavity 28 until the cavity is filled completely. Gasket 12 is then returned to its ordinary sealing position. The preferred liquid lens material is a mixture of a liquid monomer, such as CR-39, which is a registered trademark of PPG Industries and a form of allyl diglycol carbonate, a thermal initiator or catalyst, such as diisopropyl peroxydicarbonate, and a photosensitive initiator or catalyst, such as hydroxycyclohexylphenyl ketone. The now-filled mold apparatus 10 is lowered into and secured within a heated liquid bath 51 contained within vat 50, as shown in FIG. 3. The temperature of the heated liquid bath 51 is preferably maintained at 125° F. to 205° F.

After subjecting mold apparatus 10 to thermal curing for a time sufficient to gel the liquid lens material encapsulated therein is less than fifteen (15) minutes. It is believed that this gel freezes the photosensitive initiator in place throughout the gelled liquid lens material. The mold apparatus 10, while remaining in the heated liquid bath 51, but at a lower temperature, is subjected to ultraviolet light generated by light source 52 for a period sufficient about forty-five (45) minutes or less, to completely polymerize and cure the lens material. The total time necessary for producing a lens of optical quality by using this method is one hour or less. Once the lens material is completely cured, the lens is removed by removing gasket 12 from its sealing position and separating mold forms 14 and 16 and separating the lens therefrom.

There are several advantages in employing a heated liquid bath to accomplish the partial thermal curing step of the inventive process. The liquid bath controls the rate of thermal curing by removing heat generated by the exothermic polymerization reaction. The heated liquid bath serves to quickly gel the liquid lens material and subsequently cool the lens material prior to subjecting the mold forms to a UV source. The liquid bath disperses the ultraviolet light sufficiently to avoid stresses and other adverse effects on the lens ultimately formed that may be caused by uneven exposure to the ultraviolet light. The use of a liquid bath, and particularly a moving or agitated liquid bath, helps to keep the surfaces of the mold apparatus clear from any residue or debris which might impede complete exposure of the lens material to the ultraviolet light. Although cured in the liquid bath, other media could be used such as air or other fluids to achieve the desired dispersion and cooling effects. The use of dual initiators with corresponding curing steps also produces increased density in the finished product.

Figure 4:
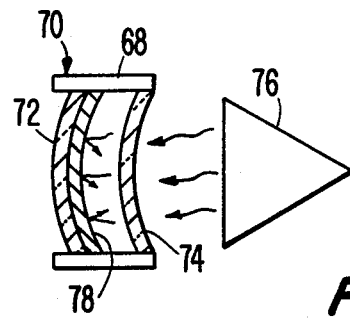
FIG. 4 is a cross section of the mold of FIG. 1 showing another embodiment of a mold used with an ultraviolet light source.

Another embodiment of Applicant's invention includes the use of a reflective surface on the surface of one of the mold forms to reflect ultraviolet light back through the lens material being cured. The operation of the mold utilizing a reflective surface is better shown in FIG. 4. There it can be seen that the forms 74 and 72 are maintained in the gasket 70 to provide a mold cavity 78 into which the monomer to be cured is inserted as described above. However, the internal mold surface of mold 72 includes a reflective 78 conformed to the concave surface of the mold as shown. The exposed surface of the reflective surface is highly polished to reflect ultraviolet light rays from the ultraviolet source 76. This surface of the reflective surface also acts as a molding surface such that it will produce on the ultimately molded item an optical quality lens. Although in this embodiment, the reflective surface is shown as being part of the mold the could be arranged externally of the mold to reflect the light waves back through the mold. In the latter embodiment, it would, of course, be necessary for both the molds 72 and 74 to be formed of relatively clear material, either glass or plastic.

Figure 5:
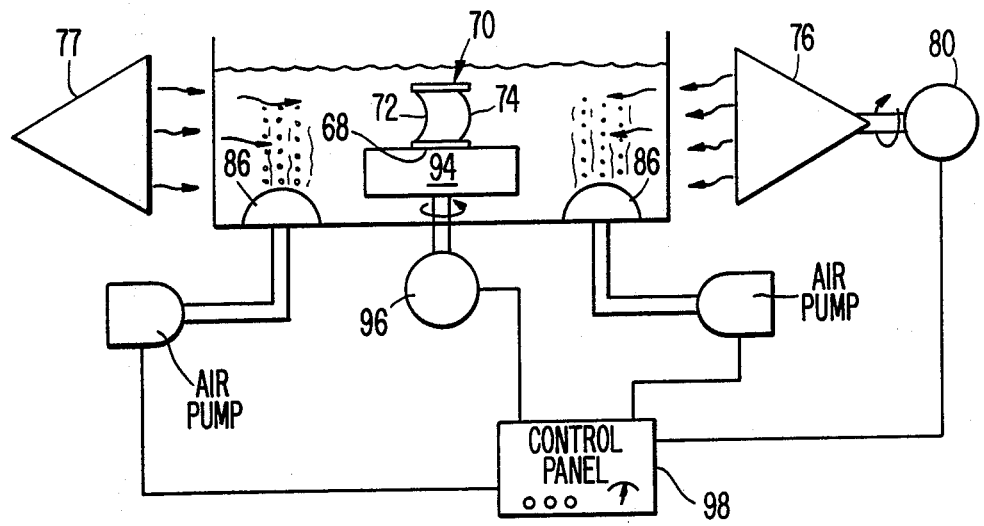
FIG. 5 is a schematic of another embodiment showing a method and apparatus for curing plastic lens material.

Another embodiment, as shown in FIG. 5, two sources of ultraviolet light rays are used in conjunction with the water bath. Tank 50 contains a water bath which Mold 70, similar to that discussed above, includes two mold forms 72, 74 to provide a molding cavity 78 into which the monomer for curing is placed. This mold 70 is then placed on a platform 94 within the tank 50. The platform 94 is secured to motor 96 for rotatable movement within tank 50 when filled with water. In this manner, when motor 96 is operated, the panel or platform 94 with the mold 70 thereon can be rotated slowly within the water bath. This insures that when mold 70 is subjected to ultraviolet light, the light is well dispersed throughout the mold. Furthermore, the exothermic reaction that takes place will occur equally throughout the mold and the surfaces of the mold can be continually washed due to the movement through the water bath. This washing effect keeps the external mold surfaces clear of debris which might otherwise channel the ultraviolet light.

Figure 6:
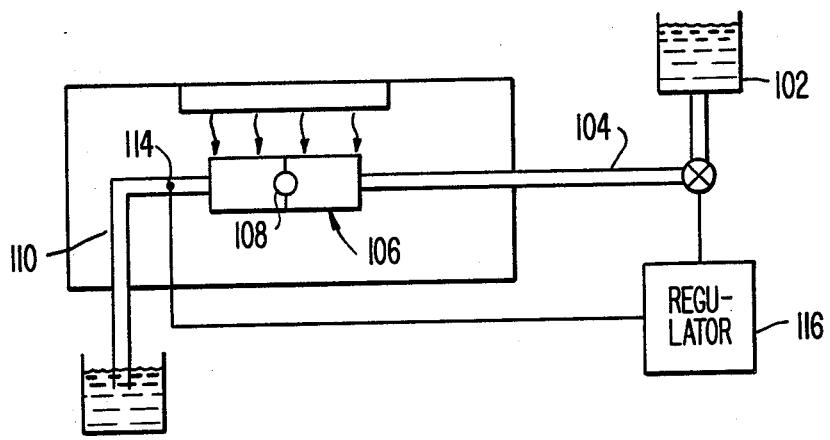
FIG. 6 is a schematic of a microwave oven system for curing plastic lens material.

An aerator 86 provides bubbles throughout the portion of the water bath between the mold and the ultraviolet rays. This enhances the dispersion of the ultraviolet rays and avoids channeling. The aerator 86 is connected by a hose 84 to air pump 82 which is operated by control panel 98. Where two ultraviolet light sources are employed, 76, 77 on either side of the water bath is shown in FIG. 6, an additional aerator 92 can be used in the bath between the source 77 and the mold 70. In this second aerator system aerator 92 is connected by a hose 90 to air pump 88 which is electrically connected to control panel 98 for its operation.

In addition to rotating the mold 70 within the bath as discussed above, the ultraviolet light source can be rotated as well either independently of rotation of the mold or together therewith. As can be seen in FIG. 6, source 72 is connected by a shaft to motor 80 which is in turn electrically connected to control panel 98. When motor 80 is placed in the "on" position, the shaft will rotate in turn, rotating the electrical source slowly. This again enhances the dispersion of the ultraviolet waves and avoids channeling and other impediments which can cause stresses within the lenses.

As discussed above, rotation and/or undulation of the light source on the mold can be used to achieve the appropriate dispersion. Other methods can also be used to control the intensity and dispersion of UV rays. Depending on the intensity of the light source, filters can be inserted between the source and the mold. The distance between the mold and source can also be varied. In addition, direct control of the source to permit only the desired range of UV rays to be emitted. These controls can be used to select certain wave length amplitude and otherwise control the intensity and dispersion of the UV light source.

Figure 8:
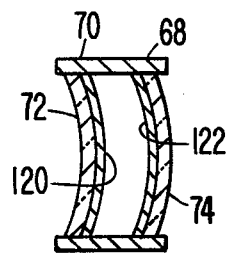
FIG. 8 is a cross-section of a molding apparatus for molding hard coated lens.

Although both the thermal and UV curing are accomplished within the fluid bath, the curing process is not so confined. The UV cure can be accomplished exterior of the bath. In this event, the mold, after curing to gelled state in the bath, is removed and subjected to a UV light source. An example of which is a "light box", as shown in FIG. 8. Light box has UV sources 102, 104 arranged at least on opposed walls and a bracket 106 for holding mold 108 in the proper position. In this particular embodiment the source utilizes light source made by Phillips Corporation known as F-72712-BLLS/SHO/O UVA/USA/1621 made by the Phillips corporation. In operation, the mold with gelled lens material is secured in the bracket and the source activated for the requisite time period to finally cure the lens by activating the photosensitive activator. This should be completed in about forty-five (45) minutes or less. The source is then deactivated to permit withdrawal of the mold. The mold is opened and the fully cured optical quality lens is removed, ready for edge grinding for subsequent insertion into a frame. To speed up the overall curing time, the monomer can be prepolymerized prior to insertion into the mold. This permits a gel to be achieved in about three (3) minutes or less, instead of the usual ten (10) to twenty (20) minutes gel time.

If any additional hardening is required, the lens can be subjected to a "post cure". Although a post cure can be utilized with any of the above noted processes, it is not available for bath cures since the mold and other intervening media may affect the ability to achieve maximum hardness. Preferably for post curing, after the thermal and UV cure, the lens is withdrawn from the mold and subjected directly to UV rays and/or heat. This post cure using UV and or a thermal source will harden the lens material even further should such additional hardness be required.

The initial gel in embodiments discussed above is obtained through the use of a thermal activator and heating. Such a gel may also be obtained through controlled application of a UV light source. Using this approach only a photosensitive initiator need be used in the lens material composition, the concentration of which is still about 1%–5% and preferably about 2%–3% as noted above. The resin used in this approach may or may not be prepolymerized.

Figure 9:
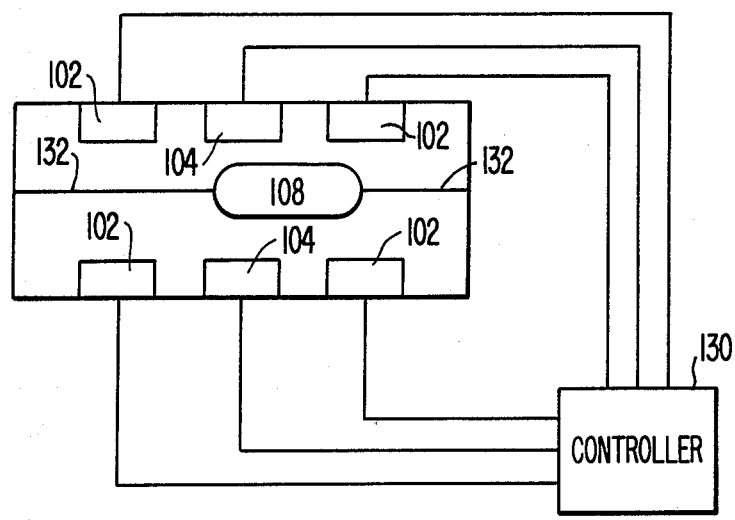
FIG. 9 is a schematic of a light box.

In this process the lens material is subjected to relatively low level of intensity for a relatively larger period of times when compared to subsequent curing. After being subjected to this low intensity, during a first phase, for about fifteen (15) minutes or less; the source is changed to a second phase to increase the intensity for about forty-five (45) minutes or less to finally cure the lens. To change from Phase I to Phase II the intensity and other parameters for that matter can be controlled by the methods noted above. In addition, different types of sources can be employed with an automatic control system for sequentially operating various lamps or sources. For example, as shown in FIG. 9, two sets of lamps 102, 104 are shown with first set 102, providing lower intensity and known wave length UV light and the second set 104 providing greater intensity and the same or other wave length. Each set is controlled by controller to operate each set independently of the other for a preselected time period.

In operation, the mold is placed in light box 100 and the controller set for a preselected time for each phase. When actuated controller 110 will cause 102 lamps to be energized for about fifteen (15) minutes or less, after which Phase II lamps 104 will be energized for the remainder of the period.

In the embodiments discussed above, light sources are used which provide 300 to 450 nanometers wave length such as florescent lights, metal halide, mercury discharge etc. These may require adjustment in activator concentration, time of cure and degree of intensity among other control parameters to accommodate a particular source.

In another embodiment the molding or curing process can take place within a microwave oven as shown in FIG. 6. However, to avoid thermal runaway, it is necessary to withdraw the heat of the exothermic reaction. This is accomplished by passing water through the oven during the curing process. As can be seen in FIG. 6, microwave oven 100 includes a container 106 within which the mold 108 is placed for curing. The container 106 has an inlet and an outlet connected to inlet hose 104 and outlet hose 110 respectively. A water bath or other liquid in tank 102 is placed upstream of container 106 and is connected thereto by the hose 104. Intermediate tank 102 and container 106 is a valve 118 operated by valve regulator 116 which is in turn connected to a temperature sensor 114 downstream of the container 106 located in hose 110. The exit end of hose 110 is connected to a sink 112 for collecting the water having passed through the oven.

Figure 7:
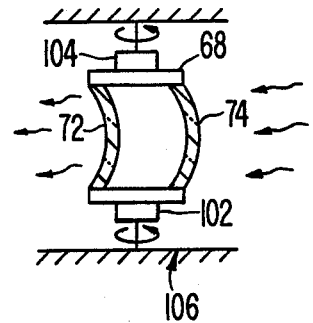
FIG. 7 shows an enlarged view of a mold arranged for rotation.

Preferably, the mold 108 is mounted for rotation within the container 106 as can be seen in FIG. 7. For this purpose, the container walls have attached thereto rotatable platforms 102 and 104 to which the mold 100 can be attached. These platforms permit the mold once fixed in place to rotate about a common axis. As shown, rotation is caused by the flow of water through the container 106.

In operation, the mold is filled with the monomer the thermal activator as discussed above. The mold is then placed between the platforms 104 and 102 as shown in FIG. 7. The inlet and outlet of the containers are closed. These platforms 102, 104 are arranged for rotatable movement with respect to walls of container 106. When the mold is fixed to the platforms it can freely rotate about the axis 110 defined by the shafts to which the platforms are attached. In operation, regulator 16 is placed in the operative position and the microwave oven 100 turned on. During the time period when mold 108 is subjected to the curing action of the microwave source, water flows through the hose 104 causing the mold form 108 to rotate about the axis. The heat of reaction caused by the effect of electromagnetic waves on the mold composition. The heated water exits container 106 through the exit hose 110 and is delivered to sink 112. The regulator senses the downstream temperature of the heated water and adjusts the valve 118 to produce the desired flow rate and avoid thermal runaway. Once sufficient curing has occurred, the mold encloses the curing process is then finished by subjecting mold to ultraviolet light and/or heat, then the system is shut down and the mold removed from the oven.

A further embodiment of the invention is to partially thermally cure the lens material until the lens material forms a gel, and remove the gelled lens material from the mold apparatus prior to any further curing. At this stage, the partially cured lens material will remain in a rubbery or flexible disposition which is then exposed directly to ultraviolet light to complete the polymerization or curing process. This method serves to avoid adverse effects of any surface residue on the mold forms since the lens will be finally cured outside of the mold.

The curing process noted above can also be used in hard coating the lens. This method involves an initial coating of the interior surfaces of the mold with the plastic material which will form the hard coat. This material is cured by heat and/or UV at least partially t maintain adherence to mold during subsequent operation of the lens curing process. The coated molds are then incorporated into the gasket as before and the lens material injected into the mold cavity. In this particular embodiment, both the coating material and the lens material contain a UV activator. When utilizing the UV curing step the hard coat will be cured with the lens material such that it will have a greater affinity for the lens than the mold. Once the UV curing is completed, the mold is broken and the lens removed with the hard coat cured on the lens.

Particularly for lens manufacturing processes using UV curing, a yellow tint may remain in the lens ultimately produced or may evolve during aging. This tinting or "yellowing" can be reduced by heating the lens material with certain anti-yellowing chemicals. These include amine hindered amine light stabilizer (HALS); optical brightners which makes the yellowing or hindered phenol antioxidants. Another method is to use a photoactive initiator which is not from the amine group and which will not cause yellowing.

It has also been found that some UV and/or thermal cured lenses may emit an offensive odor. This odor can be eliminated by dipping the cured lens into a tinting solution after the curing process is completed. A BPI-standard tinting bath for plastic lens heated to a range of 205° F. to 225° F. has been found to be satisfactory for removing the odor. Tints can range from clear 1 to all colors of spectrum.

Figure 10:
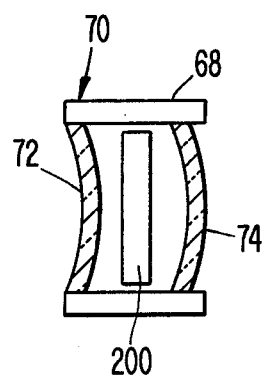
FIG. 10 is a cross-section of the mold of FIG. 1 with a wafer therein.

In using any of the curing methods above, wafers may be employed to reduce curing times and reduce stresses as shown in FIG. 10. Wafer 200 is a previously cured lens material of the same type as that being cured which is simply placed in the center of mold 70. The thickness of wafer 200 should be such that molding material can preferably fill voids on either side of wafer 200 within the mold cavity. This reduces the volume of material which must be cured. Since curing time and internal stresses are to a certain extent a function of the mass of material to be cured, time and stress are significantly reduced corresponding to the reduction of lens material required by the wafer. This wafer 200 insert can be used to speed up the overall curing with any compatible curing system; for example, UV, thermal air, thermal liquid systems.

In all of the embodiments discussed above, the molding material may be prepolymerized when utilizing the prepolymerization technique with 0.5%–1.5% thermal initiator, subjecting the mold forms with molding material therein to thermal cure of between 150° F.–210° F. will produce a substantially cured lens. It is preferable that the molding material also include a UV initiator to permit UV curing if further curing is required to achieve the desired hardness and optical quality. Such a prepolymerizing step can reduce at least the initial step to under three (3) minutes.

The above is a detailed discussion of the preferred embodiment of the invention. It should not limit the full scope of the invention, which is more fully defined in the claims which follow and their equivalents. The specification should not be construed to unduly limit this scope to which applicants are entitled.

What is claimed is:

1. A method for molding and curing plastic lenses comprising the steps of:
   (a) arranging a first mold form and a second mold form in a spaced relationship to form a mold apparatus with a cavity therebetween for receiving lens molding material and for forming a lens of selected configuration, and sealing said first and second mold forms in said spaced relationship, said first and second mold form corresponding to surfaces of a prescription lens;
   (b) injecting lens molding material comprising a liquid monomer, a thermal initiator, and a photosensitive initiator into said cavity between said mold forms;
   (c) subsequent to said injecting step, heating throughout said mold apparatus sufficiently to activate said thermal initiator to form said lens molding material into a gel;
   (d) subsequent to said heating step, subjecting said mold apparatus to ultraviolet light for a period of time sufficient to completely cure said lens molding material within said cavity from a gel into a hardened lens of optical quality; and
   (e) subsequent to said step of subjecting said mold apparatus to ultraviolet light, removing said hardened lens from said mold apparatus.

2. A method for curing plastic lenses according to claim 1, wherein said heating step includes subjecting said molding material to heat maintained at a temperature in the range between about 125° F. to 180° F.

3. The method according to claim 1 or 2 wherein said molding material includes CR39 monomer, a photosensitive initiator comprising between about 1% and 5% by weight and a thermal initiator comprising about 0.5% to 3% by weight.

4. The method according to claim 3 wherein the composition includes a photosensitive ultraviolet light initiator comprising preferably about 0.5%–3% by weight of the composition.

5. The method according to claim 4 wherein said photosensitive initiator includes 1-hydroxycyclohexyl-phenyl ketone.

6. The method according to claim 5 wherein said thermal initiator includes diisopropyl peroxydicarbonate.

7. The method according to claim 6 wherein said thermal initiator comprises about 0.5%–2% by weight of said composition.

8. The method according to claim 1 wherein heating step is maintained for at least 10 minutes and said step of subjecting the mold apparatus to ultraviolet light is maintained for at least 20 minutes.

9. The method according to claim 1 further comprising a reflective surface located at a position relative to the mold opposite the ultraviolet light source for receiving ultraviolet light waves having passed through the mold and redirecting those light waves back into the mold.

10. The method according to claim 9 wherein said reflective surface being placed on an inner surface of one of said molds and having a surface of such quality to produce optical qualities in the lens ultimately molded.

11. The method according to claim 10 wherein said mold is rotated while being subjected to said ultraviolet light waves.

12. The method according to claim 11 wherein said water bath is aerated by bubbling gas through the water between the ultraviolet light source and the mold.

13. The method according to claim 1 wherein said heating step includes placing said mold apparatus into an oven and subjecting said molding material to electromagnetic wave energy and cooling said molding material by passing a cooling fluid over said mold apparatus while it is being subjected to said electromagnetic wave energy from said wave source.

14. The method according to claim 13 wherein said cooling step includes delivering a fluid from a position exterior of the oven through the oven over the mold and discharging said heated fluid to a sink.

15. The method according to claim 14 wherein said cooling fluid includes water.

16. The method according to claim 15 wherein said mold is rotated in said oven while said cooling fluid passes thereover.

17. A method for curing plastic lenses comprising the steps of:
   (a) arranging a first mold form and a second mold form in spaced relationship to form a mold apparatus with a cavity therebetween for receiving lens molding material and for forming a lens of selected configuration, and sealing said first and second mold forms in said spaced relationship, said first and second mold forms corresponding to surfaces of a prescription lens;
   (b) injecting lens mold material comprising a liquid monomer and a photosensitive initiator into said cavity between said mold forms;
   (c) curing said molding material sufficiently to form said lens molding material into a gel;
   (d) subjecting said mold forms to ultraviolet light for a period of time sufficient to completely cure said lens molding material into a hardened lens of optical quality;
   (e) removing said hardened lens from said mold apparatus;
   (f) said step of creating a gel includes subjecting the lens molding material while in a cavity formed by said mold forms to UV light of a different intensity and wave length than a final curing step; and
   (g) said steps subjecting molding material to UV light includes controlling the intensity of said UV light received by the molding material.

18. The method according to claim 17 wherein said step of controlling the intensity includes arranging a UV light source for directing UV light rays to said mold forms and inserting a filtering means between the UV light source and the mold forms.

19. The method according to claim 17 wherein said step of controlling the intensity of UV light includes changing the distance between a UV light source and the mold forms.

20. The method according to claim 17 wherein said step of controlling the intensity of UV light directed to said mold forms includes arranging UV light sources of different power by having a first light source of a first power and a second light source of a second power, and operating lights of said first power source and second power source in a controlled manner to achieve the desired curing.

21. The method according to claim 17 wherein said step controlling the intensity of light directed to said mold forms includes providing a power source of ultraviolet light in controlling the power to said source to change the intensity emanating from said source.

22. The method according to claim 17 wherein said method for producing lenses includes adding chemical compositions to the molding material to prevent or hinder yellowing of the lenses.

23. The method according to claim 17, including the step of after removing the lens from the mold subjecting the lens to post curing to further harden the lens.

24. The method according to claim 17 further comprising the step of placing on the mold surfaces prior to said curing step a hard coating and partially curing said coating to adhere to said mold surfaces, and subsequently curing said molding material with UV light to have said hardened coating have a greater affinity for the lens material than for the mold forms.

* * * * *